G. H. PERKINS.
Fruit Can-Caps.

No. 152,953. Patented July 14, 1874.

Witnesses
L. F. Brous.
A. P. Grant.

Inventor:
George H. Perkins,
by John A. Wiedersheim &c.
Att'ys.

UNITED STATES PATENT OFFICE.

GEORGE H. PERKINS, OF PHILADELPHIA, PENNSYLVANIA, ASSIGNOR TO JOHN L. MASON, OF NEW BRUNSWICK, NEW JERSEY.

IMPROVEMENT IN FRUIT-CAN CAPS.

Specification forming part of Letters Patent No. 152,953, dated July 14, 1874; application filed May 13, 1874.

*To all whom it may concern:*

Be it known that I, GEORGE H. PERKINS, of the city and county of Philadelphia and the State of Pennsylvania, have invented a new and useful Improvement in Sheet-Metal Screw-Caps; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
Figure 2:
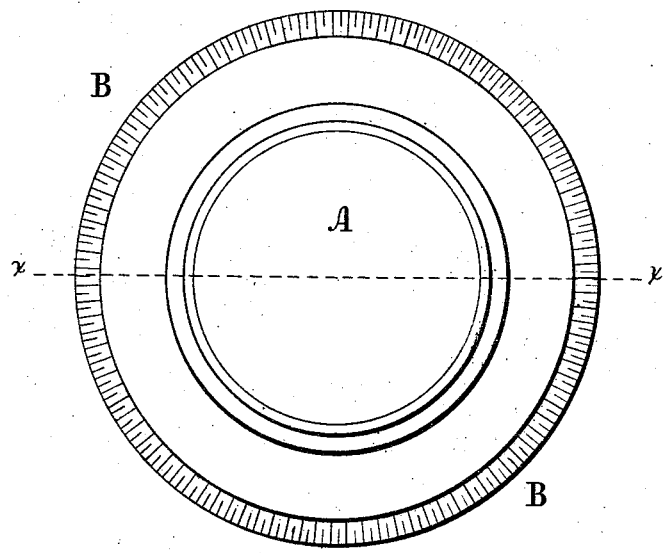
Figure 3:
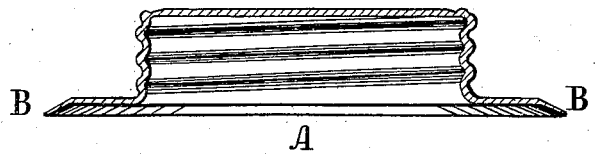

Figure 1 is a side elevation of the device embodying my invention. Fig. 2 is a top or plan view thereof. Fig. 3 is a diametric section thereof.

Similar letters of reference indicate corresponding parts in the several figures.

My invention consists in a sheet-metal screw-cap having a skimmed edge, so that the same is properly polished or cleansed, and prepared for soldering. Otherwise the soldering will be imperfectly performed, and an increased quantity of solder thereof requisite.

Referring to the drawings, A represents a sheet-metal screw-cap, which may be of well-known form and construction. B represents the rim or portion of the cap A adjacent to the edge thereof, but in the art is generally known as the edge, flange, or rim of the cap. The upper face of this edge B is subjected, by a proper tool, to the action of "skimming," whereby a thin film of the metal of the face is removed, this film constituting the rough surface of the metal as it leaves the stamping or shaping dies or machinery, such surface not being conditioned for taking hold of solder, a feature readily perceived on experiment.

In the operation of skimming, the edge becomes polished, cleansed, and slightly thinned, the rough and oxidized surface being removed. The cap is thus ready for the market or immediate usage, no after manipulation thereof being necessary to prepare the same for the subsequent soldering process. The solder readily unites with the polished surface of the rim.

Having thus described my invention, what I claim as new, and desire to secure by Letters Patent, is—

The sheet-metal screw-cap, having a skimmed edge, B, substantially as and for the purpose described.

GEORGE H. PERKINS.

Witnesses:
JOHN A. WIEDERSHEIM,
A. GRANT.